(12) United States Patent
Bhogal et al.

(10) Patent No.: US 9,071,812 B2
(45) Date of Patent: *Jun. 30, 2015

(54) INTELLIGENT RECORDING

(71) Applicant: International Business Machines Corporation, Armonk, NY (US)

(72) Inventors: Kulvir S. Bhogal, Pflugerville, TX (US); Gregory J. Boss, Saginaw, MI (US); Andrew R. Jones, Round Rock, TX (US); Brian M. O'Connell, Research Triangle Park, NC (US)

(73) Assignee: International Business Machines Corporation, Armonk, NY (US)

( * ) Notice: Subject to any disclaimer, the term of this patent is extended or adjusted under 35 U.S.C. 154(b) by 170 days.

This patent is subject to a terminal disclaimer.

(21) Appl. No.: 13/858,480

(22) Filed: Apr. 8, 2013

(65) Prior Publication Data

US 2014/0133826 A1 May 15, 2014

Related U.S. Application Data

(63) Continuation of application No. 13/212,545, filed on Aug. 18, 2011, now Pat. No. 8,442,377.

(51) Int. Cl.
*H04N 9/80* (2006.01)
*H04N 5/76* (2006.01)
(Continued)

(52) U.S. Cl.
CPC . *H04N 9/79* (2013.01); *H04N 5/76* (2013.01); *H04N 5/781* (2013.01); *H04N 9/8211* (2013.01);
(Continued)

(58) Field of Classification Search
CPC ....... H04N 5/76; H04N 5/781; H04N 9/8211; H04N 9/79; H04N 21/4334; H04N 21/4755; H04N 21/4135; H04N 21/44008; H04N 21/44222; H04N 21/4516
USPC ......... 386/326, 296, 291, 294, 292, 248, 200, 386/230
See application file for complete search history.

(56) References Cited

U.S. PATENT DOCUMENTS

| 8,442,377 B2 | 5/2013 | Bhogal et al. |
| 2006/0005223 A1 | 1/2006 | Weng et al. |

(Continued)

FOREIGN PATENT DOCUMENTS

WO    WO02097584 A2    12/2002

OTHER PUBLICATIONS

Office Action (Mail Date Nov. 7, 2012) for U.S. Appl. No. 13/212,545, filed Aug. 18, 2011; Confirmation No. 6463.

(Continued)

*Primary Examiner* — Robert Chevalier
(74) *Attorney, Agent, or Firm* — Schmeiser, Olsen & Watts; Matthew Chung

(57) ABSTRACT

An audio/video recording method and system is provided. The method includes analyzing audio/video presentation capabilities for audio/video presentation devices and formats of a first group of broadcast audio/video files associated with the broadcast audio/video data. Results of the analyses are compared and in response a first audio/video file is selected from the first group of broadcast audio/video files. The first audio/video file includes a first format requiring a first amount of storage space within a storage device of the audio/video recording device. The first format is associated with the audio/video presentation capabilities of a first audio/video presentation device and the first audio/video file is recorded.

20 Claims, 5 Drawing Sheets

(51) Int. Cl.
  *H04N 9/79* (2006.01)
  *H04N 5/781* (2006.01)
  *H04N 9/82* (2006.01)
  *H04N 21/433* (2011.01)
  *H04N 21/41* (2011.01)
  *H04N 21/44* (2011.01)
  *H04N 21/442* (2011.01)
  *H04N 21/45* (2011.01)
  *H04N 21/475* (2011.01)

(52) U.S. Cl.
  CPC ....... *H04N 21/4334* (2013.01); *H04N 21/4135* (2013.01); *H04N 21/44008* (2013.01); *H04N 21/44222* (2013.01); *H04N 21/4516* (2013.01); *H04N 21/4755* (2013.01)

(56) References Cited

U.S. PATENT DOCUMENTS

| | | |
|---|---|---|
| 2006/0015580 A1 | 1/2006 | Gabriel et al. |
| 2007/0061023 A1 | 3/2007 | Hoffberg et al. |
| 2008/0189752 A1 | 8/2008 | Moradi et al. |
| 2008/0310825 A1 | 12/2008 | Fang et al. |
| 2009/0003172 A1* | 1/2009 | Yahata et al. ............... 369/53.41 |
| 2009/0044128 A1 | 2/2009 | Baumgarten et al. |
| 2013/0044996 A1 | 2/2013 | Bhogal et al. |

OTHER PUBLICATIONS

Amendment filed Dec. 19, 2012 in response to Office Action (Mail Date Nov. 7, 2012) for U.S. Appl. No. 13/212,545 filed Aug. 18, 2011; Confirmation No. 6463.

Notice of Allowance (Mail Date Jan. 6, 2013) for U.S. Appl. No. 13/212,545 filed Aug. 18, 2011; Confirmation No. 6463.

* cited by examiner

# INTELLIGENT RECORDING

This application is a continuation application claiming priority to Ser. No. 13/212,545, filed Aug. 18, 2011, now U.S. Pat. No. 8,442,377 issued May 14, 2013.

FIELD

The present invention relates method and associated system for intelligently recording media based on device capabilities.

BACKGROUND

Storing data typically comprises an inaccurate process with little flexibility. Data storage within a system typically includes a manual process. Manually storing data may be time consuming and require a large amount of resources. Accordingly, there exists a need in the art to overcome at least some of the deficiencies and limitations described herein above.

SUMMARY

The present invention provides a method comprising: receiving, by a computer processor of an audio/video recording device from a user, a first request for recording first broadcast audio/video data; analyzing, by the computer processor, audio/video presentation capabilities for audio/video presentation devices belonging to the user; analyzing, by the computer processor, first formats of a first group of broadcast audio/video files associated with the first broadcast audio/video data; comparing, by the computer processor, results of analyzing audio/video viewing devices with results of analyzing the first formats; selecting, by the computer processor based on results of the comparing, a first audio/video file of the first group of broadcast audio/video files, the first audio/video file comprising a first format requiring a first amount of storage space within a storage device of the audio/video recording device, the first format associated with first audio/video presentation capabilities of a first audio/video presentation device of the audio/video presentation devices; and recording, by the computer processor, the first audio/video file.

The present invention provides an audio/video recording device comprising a computer processor coupled to a computer-readable memory unit, the memory unit comprising instructions that when executed by the computer processor implements a method comprising: receiving, by the computer processor from a user, a first request for recording first broadcast audio/video data; analyzing, by the computer processor, audio/video presentation capabilities for audio/video presentation devices belonging to the user; analyzing, by the computer processor, first formats of a first group of broadcast audio/video files associated with the first broadcast audio/video data; comparing, by the computer processor, results of analyzing audio/video viewing devices with results of analyzing the first formats; selecting, by the computer processor based on results of the comparing, a first audio/video file of the first group of broadcast audio/video files, the first audio/video file comprising a first format requiring a first amount of storage space within a storage device of the audio/video recording device, the first format associated with first audio/video presentation capabilities of a first audio/video presentation device of the audio/video presentation devices; and recording, by the computer processor, the first audio/video file.

The present invention provides a computer program product, comprising a computer readable storage device storing a computer readable program code, the computer readable program code comprising an algorithm that when executed by a computer processor of an audio/video recording device implements a method, the method comprising: receiving, by the computer processor from a user, a first request for recording first broadcast audio/video data; analyzing, by the computer processor, audio/video presentation capabilities for audio/video presentation devices belonging to the user; analyzing, by the computer processor, first formats of a first group of broadcast audio/video files associated with the first broadcast audio/video data; comparing, by the computer processor, results of analyzing audio/video viewing devices with results of analyzing the first formats; selecting, by the computer processor based on results of the comparing, a first audio/video file of the first group of broadcast audio/video files, the first audio/video file comprising a first format requiring a first amount of storage space within a storage device of the audio/video recording device, the first format associated with first audio/video presentation capabilities of a first audio/video presentation device of the audio/video presentation devices; and recording, by the computer processor, the first audio/video file.

The present invention advantageously provides a simple method and associated system capable of storing data.

DETAILED DESCRIPTION

Figure 1:
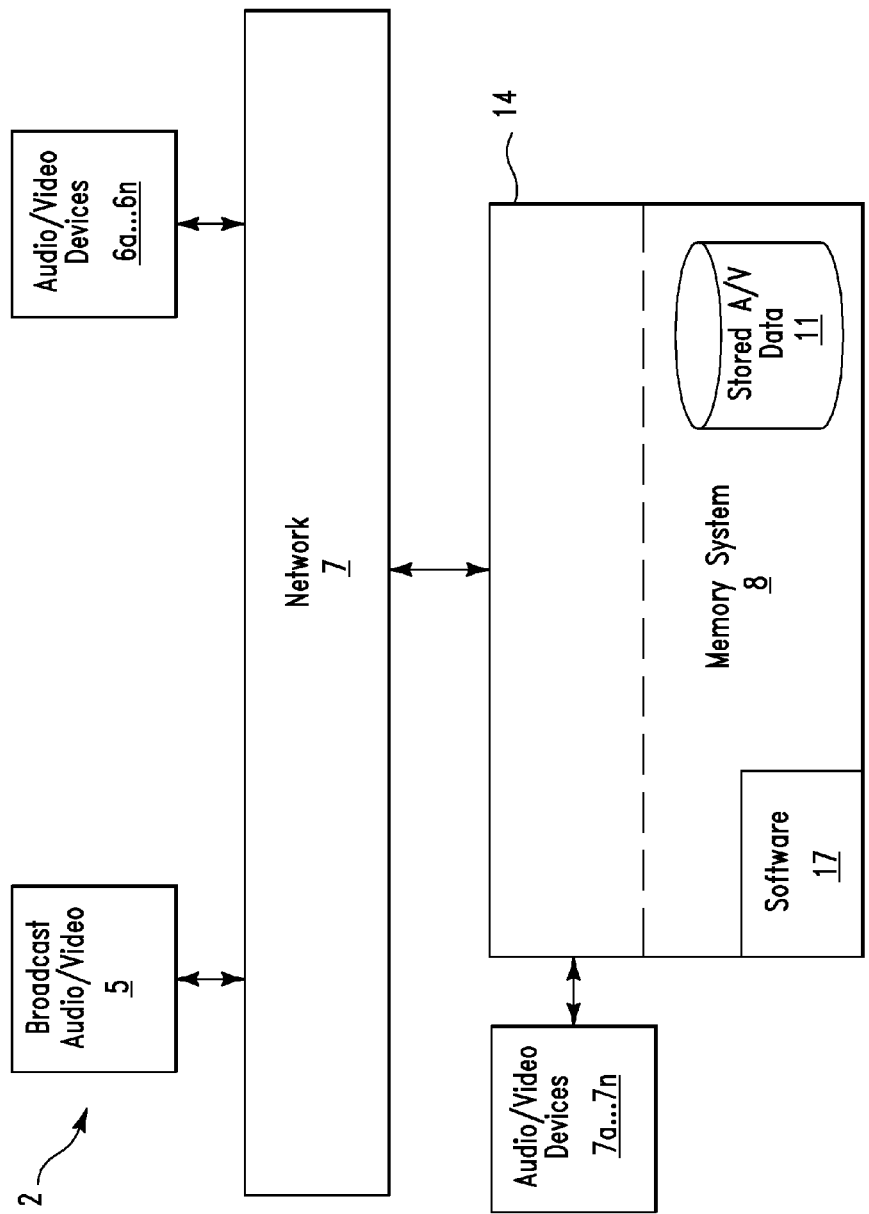
FIG. 1 illustrates a system for intelligently recording broadcast audio/video media based on capabilities of intended viewing/listening devices, in accordance with embodiments of the present invention.

FIG. 1 illustrates a system 2 for intelligently recording broadcast audio/video media 5 based on capabilities of intended viewing/listening devices, in accordance with embodiments of the present invention. Broadcast audio/video media 5 may include any type of audio/video media including, inter alia, television shows, movies, music, etc. Intended viewing/listening devices (e.g., audio/video devices 6a . . . 6n and 7a . . . 7n in FIG. 1) 5 may include any type of audio/video presentation devices (e.g., in a user's house) including, inter alia, television monitors, video monitors, audio players (e.g., mp3 music players), etc. System 2 enables a method for intelligently recording broadcast audio/video media 5 based on: a device capability matching process, a user experience matching process, and/or a process for matching based on device viewing patterns.

Device Capability Matching

A device capability matching process enables a recording method that includes matching an audio/video presentation device's capabilities with a format of broadcast audio/video media 5. For example, if a television does not have the capability to display a format of a broadcast (e.g. a three dimensional broadcast), then system 2 may locate another broadcast (e.g., a standard broadcast) for recording.

User Experience Matching

A user experience matching process enables a method for locating broadcast audio/video media 5 associated with a user preference. The process may include tests for determining the user's ability to discern quality differences in audio and/or video of broadcast audio/video media 5. For example, system 2 may determine that the user's eyesight is unable to discern the difference between a video resolution of 720 p and 1080 p. Therefore, during a recording process there is no need to consume additional storage space by recording a 1080 p broadcast. Additionally, system 2 may present a post-viewing survey to the user to determine if the user was satisfied with a recorded audio/video media's quality.

Device Viewing Patterns

A device viewing pattern process enables a method for determining which audio/video presentation device (belonging to a user) is typically used to view recorded audio/video media based on viewing patterns. For example, for the past 9 days, the user has viewed the 7 PM news broadcast on a portable video viewing device (e.g., an mp3 player) on the way to work (and not on a high definition television). In this example, a recording device (e.g., recording device 14 in FIG. 1) may suggest or enable intelligent decisions for recording a low resolution broadcast (e.g., it has been inferred that the broadcast will most likely be watched on a low resolution device with standard audio capabilities) in order to save memory space.

System 2 of FIG. 1 comprises recording broadcast audio/video media 5 and audio/video devices 6a ... 6n connected through a network 7 to a recording (computing) system 14. Alternatively and/additionally, audio/video devices 7a ... 7n may be directly connected to recording system 14 (i.e., without network 7). Network 7 may comprise any type of network including, inter alia, a telephone network, a local area network, (LAN), a wide area network (WAN), the Internet, a wireless network, etc. Recording system 14 may comprise any type of computing system(s) including, inter alia, a computer (PC), an audio/video recording device, etc. An audio/video recording device may comprise any type of recording device including, inter alia, a digital video recorder (DVR), a portable video recorder (PVR), etc. Recording system 14 comprises a memory system 8. Memory system 8 may comprise a single memory system. Alternatively, memory system 8 may comprise a plurality of memory systems. Memory system 8 comprises a software application 17 stored audio/video files retrieved from broadcast audio/video media 5. Software application controls all functionality associated with intelligently recording broadcast audio/video media 5.

System 2 enables a process for automatically retrieving and recording broadcast audio/video 5 comprising specified formats (e.g., standard definition, high-definition, digital stereo, 7.1 surround sound, etc) based on an intended viewing device's (e.g., audio/video devices 6a ... 6n and 7a ... 7n in FIG. 1) capabilities. The capabilities (along with alternative automatically determined or user defined preferences) define a procedure enabled by recording system 14 for selecting and recording a specific broadcast (of broadcast audio/video data). If recording system 14 determines that a different media stream (i.e., comprising a different format) would better fit "best" capabilities of the intended viewing device, recording system 14 may use one or more means to locate and record a better fitting broadcast stream (e.g., downgrade or upgrade the broadcast stream to produce a better fitting recording). A means for locating a better fitting broadcast stream may include a search of one or more public and/or network locations that provide audio/video media.

System 2 enables recording system 14 to analyze and/or query capabilities of audio/video devices 6a ... 6n and/or audio/video devices 7a ... 7n. Additionally or alternatively, recording system 14 analyzes and/or queries one or more user's viewing preferences. When a recording request is defined, recording system 14 determines a best-fit broadcast stream to record based upon the capabilities (of audio/video devices 6a ... 6n and/or 7a ... 7n audio/video devices 6a ... 6n.) and/or (the one or more user's viewing) preferences. In response, recording system 14 records the best-fit broadcast stream and optionally upsamples/downsamples the broadcast stream media actually recorded to a storage device (e.g., a hard disk) within recording system 14. Recording system 14 may initiate a process by detecting (querying) attached viewing devices (e.g., audio/video devices 6a ... 6n and/or audio/video devices 7a ... 7n) and obtaining associated capabilities. For example, recording system 14 may detect that there is a viewing device connected via an HDMI cable that supports a specific display resolution and audio signal type (e.g., 720 p and stereo sound, 1080 p and integrated 7.1 surround sound via digital ports, etc). The querying process may be automatically performed in-band (e.g. just prior to recording or when a recording schedule is set) or out-of-band (e.g. during a setup process that is run when recording system 14 is first installed or as requested by a user). Alternatively, the viewing devices may be manually specified by a user. For example, a user may define a portable device (e.g. an mp3 audio/video device) that may be used as a remote viewing device. During a setup process, the user may specify viewing devices and recording system 14 may use an external or internal service or data store to retrieve/download capabilities associated with the specified viewing devices. Multiple viewing devices may be queried during this process. Additionally, recording system 14 may perform out-of-band double blind tests to determine an end user's ability to discern quality differences in audio and/or video.

The following description details a process for automatically retrieving and recording broadcast audio/video 5 comprising specified formats based on an intended viewing device's capabilities:

Initially, recording system 14 analyzes a scheduled broadcast's features (or format) and compares the analyzed features with capabilities of viewing devices in order to determine a "best-fit" association. For example, a viewing device may comprise a resolution of 1080 p and stereo sound capability. In this example, software application 17 may compare these capabilities with a selected channel (e.g., a high definition (HD) channel or a standard definition (SD) channel) for scheduled recordings. If the selected channel is an HD channel and the broadcast is in digital stereo, this may comprise a "best-fit" scenario and a recording request is finalized and recorded as described, infra. Alternatively, additional information from other sources (e.g., a viewing guide delivered to recording system 14 by a broadcast provider) may be used to determine broadcast capabilities. Additionally, a user may specify preferences (e.g. always record in SD if recording system 14 storage space comprises less than 15% space available) for a specified recording format. The user may specify preferences for an intended viewing device specification when a recording is scheduled. Alternatively, recording system 14 may utilize a past viewing history of similar recordings to select an intended "best-fit" viewing device. For example, recording system 14 may determine that 75% of episodes of a specific recorded television show are remotely viewed from a first device connected to an upstairs set top box. Therefore capabilities associated with the first device are used to select a broadcast format. If a selected channel/broadcast does not comprise a "best-fit", then recording system 14 may search alternative broadcasts. Searching for alternative broadcasts may include searching all channels that are broadcasting the selected broadcast (e.g., a selected broadcast may be aired on an HD and an SD channel). Alternatively, recording system 14 may search for scheduled broadcasts within a defined period of time from a scheduled recording. Additionally, recording system 14 may search for specific broadcasts from alternative media sources (e.g. via Internet downloadable files from a source channel website or other services such as a movie provider network). Additionally, recording system 14 may be enhanced with a post-viewing survey process that may ask a viewer if they were satisfied with a recorded media's quality. The viewer responses may be utilized as an input to software application 17 for automatically retrieving and recording specific broadcast audio/video 5. For example, if a recording was recorded in 720 i but was viewed from an unexpected device that comprises a higher resolution, then future similar scheduled recordings may be automatically recorded in a higher quality (e.g., 1080 p). Furthermore, recording system 14 may be enabled to monitor a viewing device and reanalyze a match between an actual device being used to view a recording and audio/video media that was recorded. If the analysis determines that the match does not associate with "best-fit" criteria, recording system 14 may search for a better fit broadcast.

Figure 2:
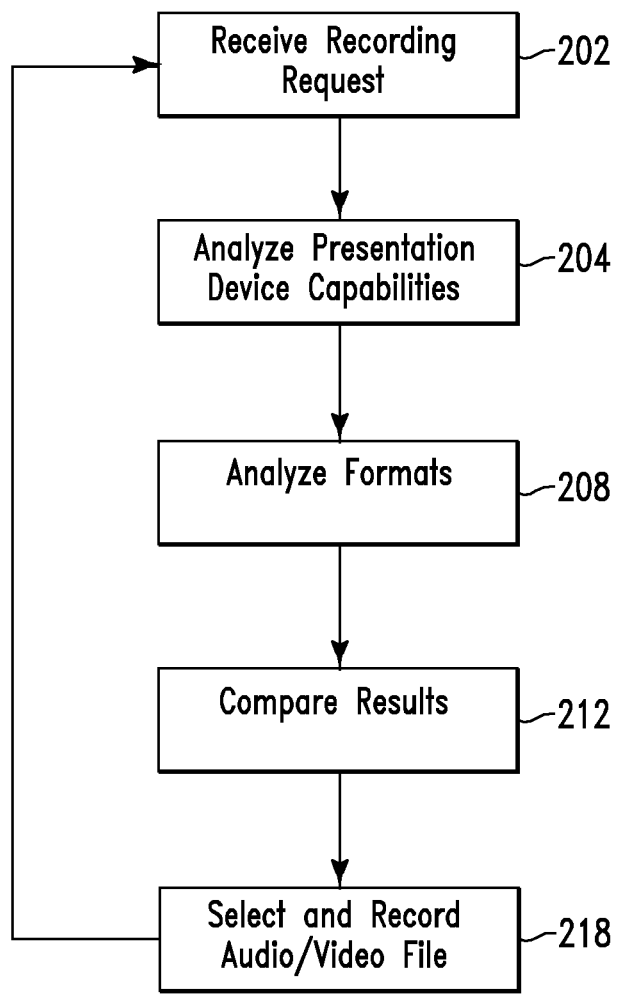
FIG. 2 illustrates a flowchart describing an algorithm used by the system of FIG. 1 for intelligently recording broadcast audio/video media based on capabilities of intended viewing/listening devices, in accordance with embodiments of the present invention.

FIG. 2 illustrates a flowchart describing an algorithm used by system 2 of FIG. 1 for providing for intelligently recording broadcast audio/video media based on capabilities of intended viewing/listening devices, in accordance with embodiments of the present invention. In step 202, a computer processor of a computing apparatus (e.g., recording system 14 of FIG. 1) receives (from a user) a request for recording broadcast audio/video data (e.g., broadcast audio/video 5 in FIG. 1). In step 204, the computer processor analyzes audio/video presentation capabilities for (connected) audio/video presentation devices (e.g., audio/video devices 6a . . . 6n and/or audio/video devices 7a . . . 7n of FIG. 1) belonging to the user. In step 208, the computer processor analyzes formats of a first group of broadcast audio/video files associated with the first broadcast audio/video data. In step 212, the computer processor compares results of the analyses of steps 204 and 208. In step 218, the computer processor selects (based on results of the comparison in step 212) a first audio/video file of the first group of broadcast audio/video files. The first audio/video file includes a first format requiring a first amount of storage space within a storage device of the audio/video recording device. The first format is associated with first audio/video presentation capabilities of a first audio/video presentation device of the audio/video presentation devices. In step 218, the first audio/video file is recorded and step 202 is repeated upon a new recording request from the user.

Figure 3:
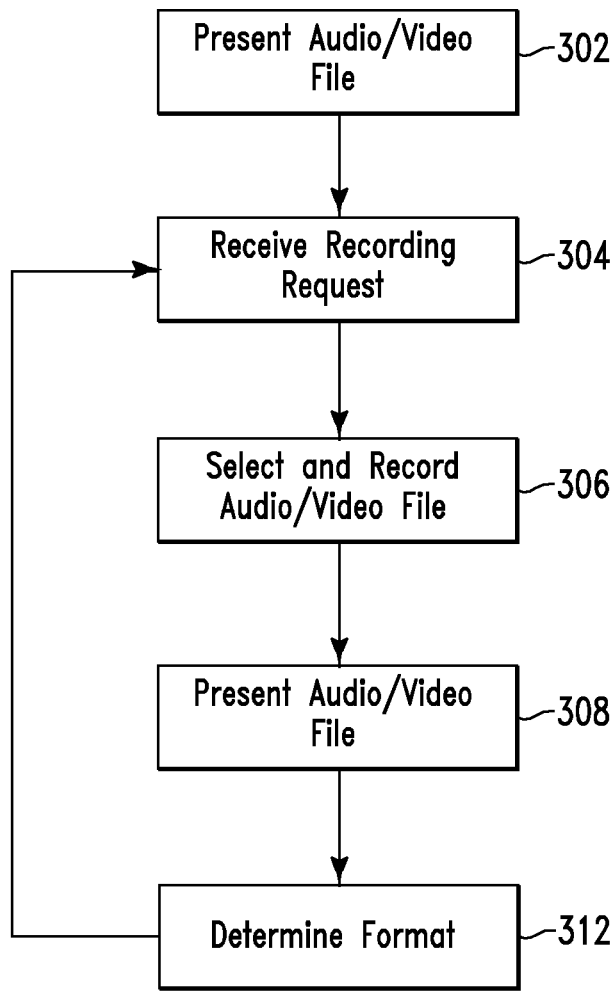
FIG. 3 illustrates a flowchart describing an algorithm used by the system of FIG. 1 for performing a user experience matching process to select additional broadcast audio/video media for recording, in accordance with embodiments of the present invention.

FIG. 3 illustrates a flowchart describing an algorithm used by system 2 of FIG. 1 for performing a user experience matching process to select additional broadcast audio/video media for recording, in accordance with embodiments of the present invention. In step 302, a computer processor (via the first audio/video presentation device selected in the algorithm of FIG. 2) presents the first audio/video file to the user. In step 304, the computer processor receives (from the user) an additional request for recording additional broadcast audio/video data. In step 306, the computer processor selects (and records) a second audio/video file comprising the additional broadcast audio/video data. The second specified audio/video file comprises a second format requiring a second amount of storage space within the storage device of the audio/video recording device. The second amount of storage space is less than the first amount of storage space from step 212 of FIG. 1. In step 308, the computer processor presents (via the first audio/video presentation device) the second specified audio/video file to the user. In step 312, the computer processor determines if future audio/video files should be recorded using the first format or the second format. The determination may be made based on an unprompted response (or no response) from the user. Additionally, the determination may be made by presenting a survey (to the user) comprising questions associated the first format and the second format and receiving (and analyzing) feedback data associated with the survey.

Figure 4:
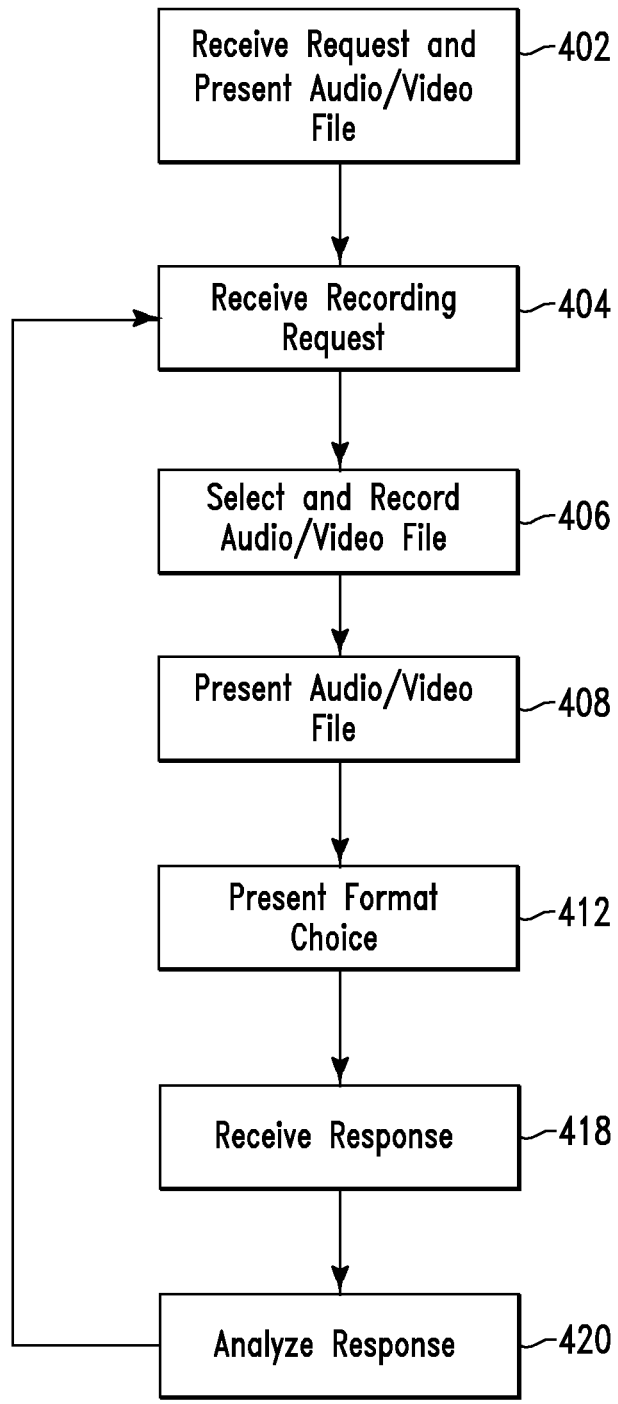
FIG. 4 illustrates a flowchart describing an algorithm used by the system of FIG. 1 for performing a device viewing patterns process to select additional broadcast audio/video media for recording, in accordance with embodiments of the present invention.

FIG. 4 illustrates a flowchart describing an algorithm used by system 2 of FIG. 1 for performing a device viewing patterns process to select additional broadcast audio/video media for recording, in accordance with embodiments of the present invention. In step 402, a computer processor receives a request (from the user) for presenting the first audio/video file (recorded in step 218 of FIG. 2) via a second audio/video presentation device. The second audio/video presentation device is associated with audio/video files comprising a second format (differing from the first format of FIG. 2) requiring a specified amount of storage space within a storage device of an audio/video recording device. The first audio/video file is presented (via the second audio/video presentation device) to the user. In step 404, the computer processor receives a request for recording additional broadcast audio/video data. In step 406, the computer processor selects and records a second audio/video file comprising the additional broadcast audio/video data comprising the second format. In step 408, the computer processor presents (via the second audio/video presentation device) the second specified audio/video file to the user. In step 412, the computer processor presents (to the user) a choice between the first format and the second format. In step 418, the computer processor receives (from the user) a response associated with the choice. In step 420, the computer processor analyzes the response to determine if future audio/video files should be recorded using the first format or the second format.

Figure 5:
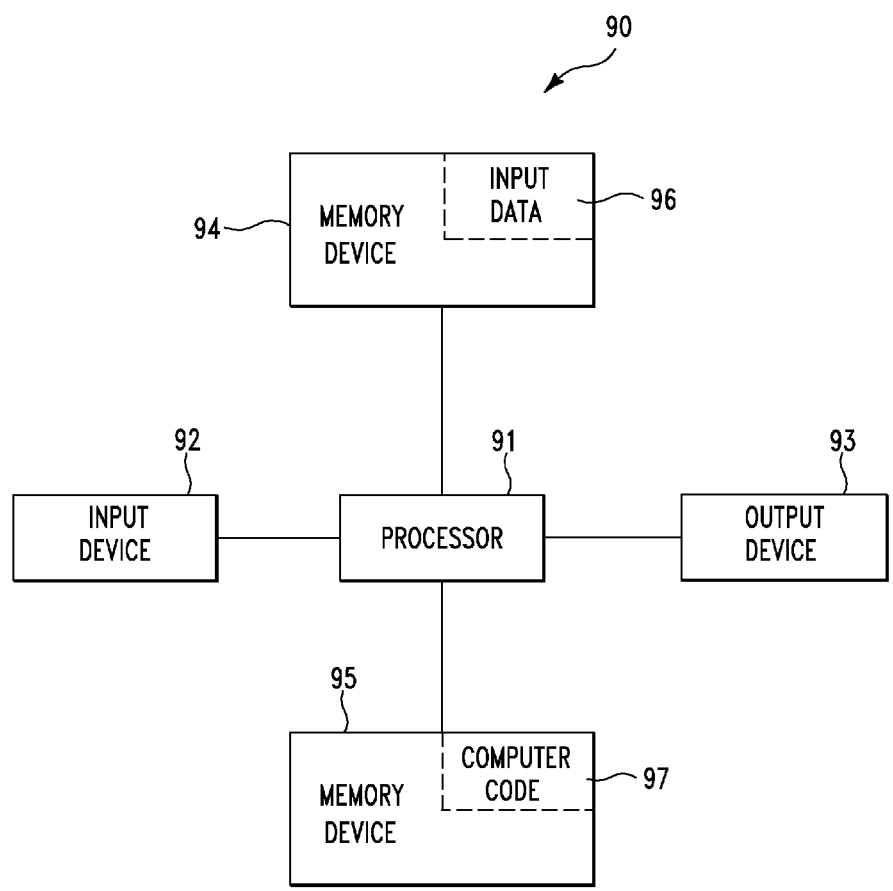
FIG. 5 illustrates a computer apparatus used for intelligently recording broadcast audio/video media based on capabilities of intended viewing/listening devices, in accordance with embodiments of the present invention.

FIG. 5 illustrates a computer apparatus 90 (e.g., recording system 14 of FIG. 1) used for intelligently recording broadcast audio/video media based on capabilities of intended viewing/listening devices, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithms of FIGS. 2-4) for providing for intelligently recording broadcast audio/video media based on capabilities of intended viewing/listening devices. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 5) may comprise the algorithms of FIGS. 2-4 and may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise the computer usable medium (or said program storage device).

Still yet, any of the components of the present invention could be created, integrated, hosted, maintained, deployed, managed, serviced, etc. by a service supplier who offers to intelligently record broadcast audio/video media based on capabilities of intended viewing/listening devices. Thus the present invention discloses a process for deploying, creating, integrating, hosting, maintaining, and/or integrating computing infrastructure, comprising integrating computer-readable code into the computer system 90, wherein the code in combination with the computer system 90 is capable of performing a method for intelligently recording broadcast audio/video media based on capabilities of intended viewing/listening devices. In another embodiment, the invention provides a business method that performs the process steps of the invention on a subscription, advertising, and/or fee basis. That is, a service supplier, such as a Solution Integrator, could offer to intelligently record broadcast audio/video media based on capabilities of intended viewing/listening devices. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 5 shows the computer system 90 as a particular configuration of hardware and software, any configuration of hardware and software, as would be known to a person of ordinary skill in the art, may be utilized for the purposes stated supra in conjunction with the particular computer system 90 of FIG. 5. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method comprising:
analyzing, by a computer processor of an audio/video recording device belonging to a user, audio/video presentation capabilities for audio/video presentation devices belonging to said user;
analyzing, by said computer processor, first formats of a first group of broadcast audio/video files associated with first broadcast audio/video data;
comparing, by said computer processor, results of said analyzing audio/video viewing devices with results of said analyzing said first formats; and
selecting, by said computer processor based on results of said comparing, a first audio/video file of said first group of broadcast audio/video files, said first audio/video file comprising a first format requiring a first amount of storage space within a storage device of said audio/video recording device, said first format associated with first audio/video presentation capabilities of a first audio/video presentation device of said audio/video presentation devices.

2. The method of claim 1, further comprising:
presenting, by said computer processor via said first audio/video presentation device, said first audio/video file to said user;
receiving, by said computer processor from said user, a second request for recording second broadcast audio/video data;
selecting, by said computer processor, a second audio/video file comprising said second broadcast audio/video data, said second specified audio/video file comprising a second format requiring a second amount of storage space within said storage device of said audio/video recording device, wherein said second amount of storage space is less than said first amount of storage space;
recording, by said computer processor, said second specified audio/video file;
presenting, by said computer processor via said first audio/video presentation device, said second specified audio/video file to said user; and
determining, by said computer processor, if future audio/video files should be recorded using said first format or said second format.

3. The method of claim 2, wherein said determining is based on an unprompted response from said user.

4. The method of claim 2, wherein said determining is based on no response from said user.

5. The method of claim 2, wherein said determining comprises:
presenting, by said computer processor to said user, a survey comprising questions associated with said first format and said second format;
receiving, by said computer processor from said user, feedback data associated with said survey; and
analyzing, by said computer processor, said feedback data.

6. The method of claim 1, further comprising:
receiving, by said computer processor from said user, a request for presenting said first audio/video file via a second audio/video presentation device of said audio/video presentation devices, wherein said second audio/video presentation device is associated with audio/video files comprising a second format requiring a second amount of storage space within said storage device, and wherein said second amount of storage space is less than said first amount of storage space;
presenting, by said computer processor via said second audio/video presentation device, said first audio/video file to said user;
receiving, by said computer processor from said user, a second request for recording second broadcast audio/video data;
selecting, by said computer processor, a second audio/video file comprising said second broadcast audio/video data, said second specified audio/video file comprising said second format;

recording, by said computer processor, said specified audio/video file;

presenting, by said computer processor via said second audio/video presentation device, said second specified audio/video file to said user; and determining, by said computer processor, if future audio/video files should be recorded using said first format or said second format.

7. The method of claim 6, wherein said determining comprises:

presenting, by said computer processor to said user, a choice between said first format and said second format;

receiving, by said computer processor from said user, a response associated with said choice; and analyzing, by said computer processor, said response.

8. The method of claim 1, wherein said first format is associated with a specified video resolution of said first audio/video file.

9. The method of claim 1, wherein said first format is associated with a specified audio format of said first audio/video file.

10. The method of claim 1, further comprising:

providing a process for supporting computer infrastructure, said process comprising providing at least one support service for at least one of creating, integrating, hosting, maintaining, and deploying computer-readable code in the computing apparatus, wherein the code in combination with the computing apparatus is configured to perform the method of claim 1.

11. An audio/video recording device comprising a computer processor coupled to a computer-readable memory unit, said memory unit comprising instructions that when executed by the computer processor implements a method comprising:

analyzing, by said computer processor, audio/video presentation capabilities for audio/video presentation devices belonging to a user;

analyzing, by said computer processor, first formats of a first group of broadcast audio/video files associated with said first broadcast audio/video data;

comparing, by said computer processor, results of said analyzing audio/video viewing devices with results of said analyzing said first formats; and selecting, by said computer processor based on results of said comparing, a first audio/video file of said first group of broadcast audio/video files, said first audio/video file comprising a first format requiring a first amount of storage space within a storage device of said audio/video recording device, said first format associated with first audio/video presentation capabilities of a first audio/video presentation device of said audio/video presentation devices.

12. The audio/video recording device of claim 11, wherein said method further comprises:

presenting, by said computer processor via said first audio/video presentation device, said first audio/video file to said user;

receiving, by said computer processor from said user, a second request for recording second broadcast audio/video data;

selecting, by said computer processor, a second audio/video file comprising said second broadcast audio/video data, said second specified audio/video file comprising a second format requiring a second amount of storage space within said storage device of said audio/video recording device, wherein said second amount of storage space is less than said first amount of storage space;

recording, by said computer processor, said second specified audio/video file;

presenting, by said computer processor via said first audio/video presentation device, said second specified audio/video file to said user; and determining, by said computer processor, if future audio/video files should be recorded using said first format or said second format.

13. The audio/video recording device of claim 12, wherein said determining is based on an unprompted response from said user.

14. The audio/video recording device of claim 12, wherein said determining is based on no response from said user.

15. The audio/video recording device of claim 12, wherein said determining comprises:

presenting, by said computer processor to said user, a survey comprising questions associated with said first format and said second format;

receiving, by said computer processor from said user, feedback data associated with said survey; and analyzing, by said computer processor, said feedback data.

16. The audio/video recording device of claim 11, wherein said method further comprises:

receiving, by said computer processor from said user, a request for presenting said first audio/video file via a second audio/video presentation device of said audio/video presentation devices, wherein said second audio/video presentation device is associated with audio/video files comprising a second format requiring a second amount of storage space within said storage device, and wherein said second amount of storage space is less than said first amount of storage space;

presenting, by said computer processor via said second audio/video presentation device, said first audio/video file to said user;

receiving, by said computer processor from said user, a second request for recording second broadcast audio/video data;

selecting, by said computer processor, a second audio/video file comprising said second broadcast audio/video data, said second specified audio/video file comprising said second format;

recording, by said computer processor, said second specified audio/video file;

presenting, by said computer processor via said second audio/video presentation device, said second specified audio/video file to said user; and determining, by said computer processor, if future audio/video files should be recorded using said first format or said second format.

17. The audio/video recording device of claim 16, wherein said determining comprises:

presenting, by said computer processor to said user, a choice between said first format and said second format;

receiving, by said computer processor from said user, a response associated with said choice; and analyzing, by said computer processor, said response.

18. The audio/video recording device of claim 11, wherein said first format is associated with a specified video resolution of said first audio/video file.

19. The audio/video recording device of claim 11, wherein said first format is associated with a specified audio format of said first audio/video file.

20. A computer program product, comprising a computer readable hardware storage device storing a computer readable program code, said computer readable program code comprising an algorithm that when executed by a computer processor of an audio/video recording device implements a method, said method comprising:

analyzing, by said computer processor, audio/video presentation capabilities for audio/video presentation devices belonging to a user;

analyzing, by said computer processor, first formats of a first group of broadcast audio/video files associated with said first broadcast audio/video data;

comparing, by said computer processor, results of said analyzing audio/video viewing devices with results of said analyzing said first formats; and selecting, by said computer processor based on results of said comparing, a first audio/video file of said first group of broadcast audio/video files, said first audio/video file comprising a first format requiring a first amount of storage space within a storage device of said audio/video recording device, said first format associated with first audio/video presentation capabilities of a first audio/video presentation device of said audio/video presentation devices.

\* \* \* \* \*